United States Patent [19]
Shimada et al.

[11] Patent Number: 5,355,772
[45] Date of Patent: Oct. 18, 1994

[54] HYDRAULIC SERVO UNIT WITH SOLENOID OPERATED VALVES HAVING VARIABLE DUTY CYCLES

[75] Inventors: Takamichi Shimada, Nerima; Yoshikazu Ishikawa, Hiki; Kouji Yamaguchi, Tokorozawa, all of Japan

[73] Assignee: Honda Giken Kogyo Kabushiki Kaisha, Tokyo, Japan

[21] Appl. No.: 903,723

[22] Filed: Jun. 24, 1992

[30] Foreign Application Priority Data

Jun. 24, 1991 [JP] Japan .................. 3-178803

[51] Int. Cl.⁵ ............ F15B 15/17; F15B 13/044
[52] U.S. Cl. ..................... 91/417 R; 91/459
[58] Field of Search ........... 91/415, 417 R, 459, 91/361, 392, 51; 60/327

[56] References Cited

U.S. PATENT DOCUMENTS

| | | | |
|---|---|---|---|
| H249 | 4/1987 | Welford | 91/469 X |
| Re. 33,846 | 3/1992 | Kramer et al. | 91/361 |
| 3,763,744 | 10/1973 | Fournell et al. | 91/417 R X |
| 3,874,407 | 4/1975 | Griswold | 91/459 X |
| 4,256,017 | 3/1981 | Eastman | 91/417 R |
| 4,366,743 | 1/1983 | Leszczewski | 91/417 R X |
| 4,386,553 | 6/1983 | Thoman et al. | 91/361 |
| 4,766,921 | 8/1988 | Williams | 91/459 X |
| 4,790,403 | 12/1988 | Akita et al. | 123/360 X |
| 4,813,335 | 3/1989 | Wakiya et al. | 91/361 |
| 4,876,944 | 10/1989 | Wilson et al. | 91/459 X |
| 4,947,734 | 8/1990 | Fujita et al. | 91/459 X |
| 4,951,468 | 8/1990 | Sasajima et al. | 91/459 X |
| 5,018,431 | 5/1991 | Gray et al. | 91/459 X |
| 5,023,535 | 6/1991 | Miller et al. | 91/362 X |
| 5,119,717 | 6/1992 | Yasutome | 91/459 X |

FOREIGN PATENT DOCUMENTS

| | | | |
|---|---|---|---|
| 2246809 | 3/1974 | Fed. Rep. of Germany | 91/417 R |
| 56-95722 | 8/1981 | Japan . | |
| 0062701 | 4/1984 | Japan | 91/417 R |
| 1108466 | 4/1989 | Japan . | |
| 1418511 | 8/1988 | U.S.S.R. | 91/417 R |

*Primary Examiner*—Edward K. Look
*Assistant Examiner*—John Ryznic
*Attorney, Agent, or Firm*—Lyon & Lyon

[57] ABSTRACT

A hydraulic servo unit for changing the swash plate angle of a continuously variable transmission to vary its speed reduction ratio comprises a cylinder whose chamber is divided into a rod-side chamber and a head-side chamber by a piston slidably fitted therein. The rod-side chamber is supplied with working oil under predetermined hydraulic pressure through a first hydraulic pressure supply passage. A second hydraulic pressure supply passage is connected to the head-side chamber through a duty-cycle-controlled first solenoid-operated valve, and a drain hydraulic passage is connected to the second hydraulic pressure supply passage through a second duty-cycle-controlled solenoid-operated valve. The first and second solenoid-operated valves are simultaneously actuated with different duty cycles. The difference between the different duty ratios is varied to vary the rate at which the working oil flows into or out of the head-side chamber through the second hydraulic pressure supply passage, in a wide range from a very low rate to a high rate. The working oil can accurately be controlled especially in a very low rate range for operating the hydraulic servo unit at very low speed. Therefore, continuously variable transmission can precisely and smoothly be controlled for varying the speed reduction ratio.

11 Claims, 5 Drawing Sheets

HYDRAULIC SERVO UNIT WITH SOLENOID OPERATED VALVES HAVING VARIABLE DUTY CYCLES

BACKGROUND OF THE INVENTION

1. Field of the Invention

The present invention relates to an apparatus for controlling operation of a hydraulic servo unit which may be used for the control of the speed reduction ratio of a continuously variable transmission.

2. Description of the Prior Art

There have heretofore been proposed various continuously variable transmissions in which the speed reduction ratio between input and output shafts is continuously variable. For example, Japanese laid-open patent publication No. 56-95722 discloses a continuously variable transmission for use on a motor vehicle, which comprises a hydraulic closed circuit composed of a fixed-displacement hydraulic pump and a variable-displacement hydraulic motor.

While the motor vehicle is running, the speed reduction ratio of the continuously variable transmission is controlled by a hydraulic servo unit that is controlled based on a throttle opening, a vehicle speed, etc. One known apparatus for controlling operation of such a hydraulic servo unit is disclosed in Japanese laid-open patent publication No. 1-108466, for example. In the disclosed apparatus, a first hydraulic pressure supply passage for supplying working oil under a predetermined hydraulic pressure is connected to a rod-side chamber in a cylinder serving as a hydraulic servo unit, and a second hydraulic pressure supply passage is connected to a head-side chamber of the cylinder. The second hydraulic pressure supply passage is connected to the first hydraulic pressure supply passage through a first solenoid-operated valve which can be opened and closed based on the duty cycle of a pulse signal applied to the solenoid thereof. The second hydraulic pressure supply passage is also connected to a drain circuit through a second solenoid-operated valve which can be opened and closed based on the duty cycle of a pulse signal applied to the solenoid thereof.

To reduce the speed reduction ratio of the continuously variable transmission, the first solenoid-operated valve is opened to supply working oil to the head-side chamber of the cylinder, and the second solenoid-operated valve is closed. To increase the speed reduction ratio, the second solenoid-operated valve is opened to allow working oil to flow out of the head-side chamber of the cylinder, and the first solenoid-operated valve is closed.

Each of the first and second solenoid-operated valves can increase or reduce the rate at which the working oil flows linearly in proportion to the increase or reduction in the duty cycle of the pulse signal insofar as the duty cycle falls within a range of 20 to 80%, for example, which is referred to as a "linearity control range".

If the duty cycle decreased below the linearity control range, then the solenoid-operated valves would operate incompletely, i.e., would start to be closed before the flow passage therethrough is not fully opened, i.e., its cross-sectional area does not reach a maximum area. The rate at which the working oil flows would not increase or decrease in proportion to the duty cycle, thus making it difficult to control the hydraulic servo unit for low-speed or inching operation accurately through the control of the duty cycle.

Even when the solenoid-operated valves are actuated with the same duty cycle, the rate at which the working oil flows varies depending on the temperature of the working oil. It is therefore difficult to control the hydraulic servo unit to operate slowly with stability at all dimes.

Higher vehicle running performance standards require that the speed reduction ratio of a continuously variable transmission be precisely controlled to meet running conditions that vary from time to time, even while the vehicle is running substantially steadily to meet such a requirement, the hydraulic servo unit needs to operate accurately and stably especially at very low-speed. However, inasmuch as the solenoid-operated valves cannot accurately be controlled with those duty cycles which are smaller than the linearity control range, and also since the oil temperature affects the working oil rate, it has heretofore been quite difficult to control the speed reduction ratio of the transmission.

SUMMARY OF THE INVENTION

In view of the aforesaid drawbacks of the conventional apparatus for controlling operation of a hydraulic servo unit, it is an object of the present invention to provide an apparatus for controlling operation of a hydraulic servo unit accurately and stably especially at very low speed.

According to the present invention, there is provided an apparatus for controlling operation of a hydraulic servo unit, comprising a hydraulic servo unit comprising a cylinder having a cylinder chamber defined therein, a piston slidably fitted in the cylinder chamber, and a rod projecting axially from the piston, the piston dividing the cylinder chamber into a rod-side chamber on one side of the piston the rod extending through the rod-side chamber, and a headside chamber on an opposite side of the piston, a first hydraulic pressure supply passage connected to the rod-side chamber for supplying working oil under predetermined hydraulic pressure, a first solenoid-operated valve openable and closable according to a duty cycle of a pulse signal applied thereto, a second hydraulic pressure supply passage connected to the head-side chamber through the first solenoid-operated valve, a second solenoid-operated valve openable and closable according to a duty cycle of a pulse signal applied thereto, a drain hydraulic passage connected to the second hydraulic pressure supply passage through the second solenoid-operated valve, and control means for simultaneously actuating the first and second solenoid-operated valves with different duty ratios, while varying the difference between the different duty cycles to vary a rate at which the working oil flows into or out of the head-side chamber through the second hydraulic pressure supply passage.

To vary the rate at which the working oil flows into the head-side chamber through the second hydraulic pressure supply passage, the difference between the different duty cycles is varied by keeping the duty cycle for the second solenoid-operated valve at a predetermined duty ratio within the linearity control range and varying the duty cycle for the first solenoid-operated valve within the linearity control range. To vary the rate at which the working oil flows out of the head-side chamber through the second hydraulic pressure supply passage, the difference between the different duty cycles by keeping the duty cycle for the first solenoid-operated valve at a predetermined duty cycle within the linearity control range and varying the duty cycle for the second solenoid-operated valve within the linearity control range.

Since the duty cycles for time simultaneously actuated solenoid-operated valves are different from each other, the rate (supply rate) at which the working oil flows from the first hydraulic pressure supply passage through the first solenoid-operated valve into the second hydraulic pressure supply passage is different from the rate (discharge rate) at which the working oil is drained from the second hydraulic pressure supply passage through the second solenoid-operated valve. The working oil flows at a rate corresponding to the difference between the supply and discharge rates into or out of the head-side chamber. This working oil flow rate can be increased or reduced by increasing or reducing the difference between the duty cycles. When the duty cycles for the solenoid-operated valves are suitably selected in the linearity control range to reduce the duty cycle difference, for example, the supply and discharge rates are accurately controlled to cause the working oil to flow into or out of the hydraulic servo unit accurately at a very low rate for operating the hydraulic servo unit at low speed.

Since the solenoid-operated valves are actuated simultaneously, even when the temperature of the working oil varies to fluctuate the supply rate, the discharge rate also varies due to the temperature change. As a result, any temperature-dependent change in the rate at which the working oil flows into and out of the head-side chamber, which would otherwise occur due to the difference between the supply and discharge rates, is minimized.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
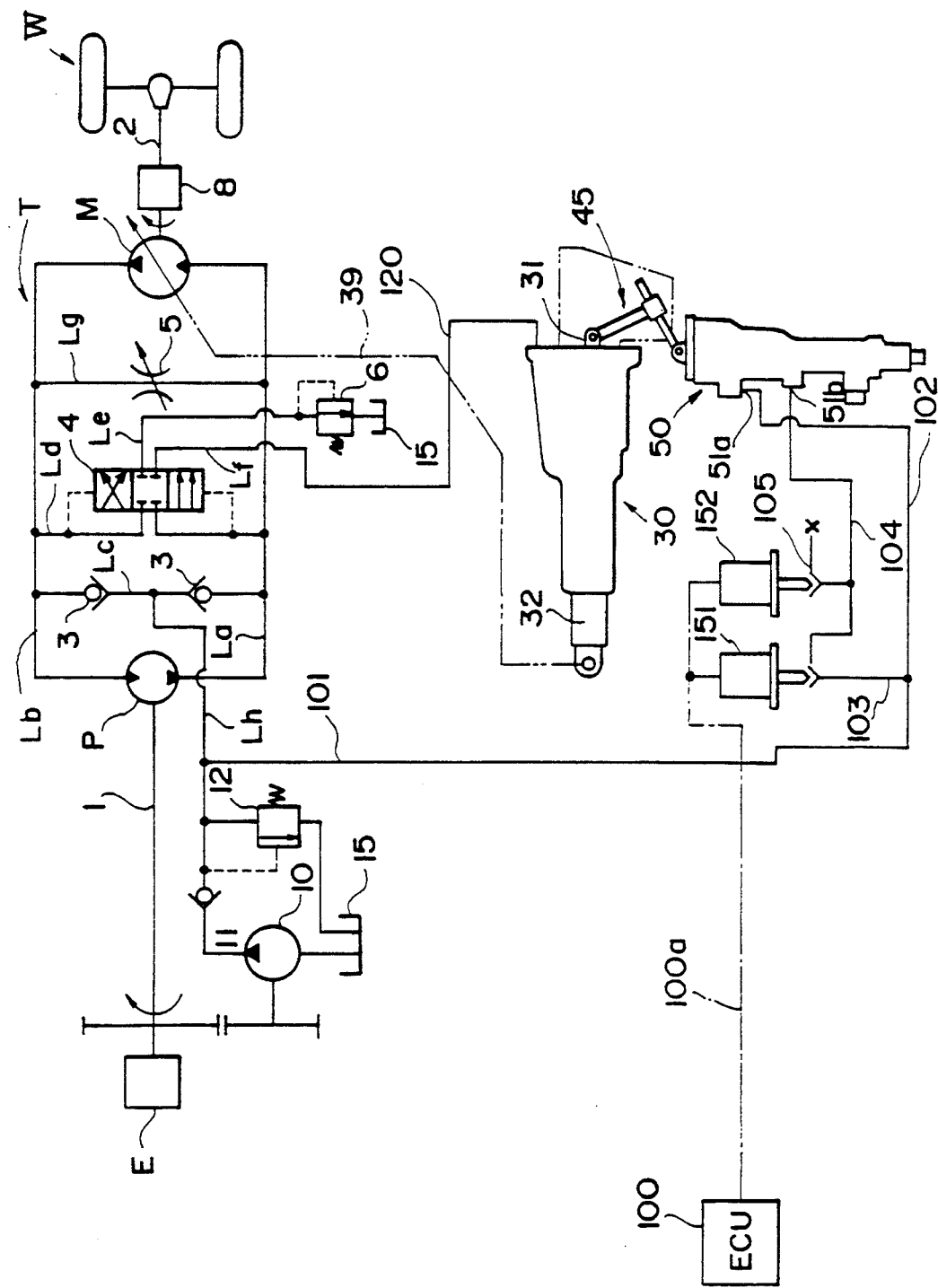
FIG. 1 is a circuit diagram of a hydraulic circuit of hydraulic servo units with an operation control apparatus according to the present invention and a continuously variable transmission that can be actuated by the hydraulic servo unit.

FIG. 1 shows a hydraulic circuit of a continuously variable transmission combined with hydraulic servo units that are controlled by an operation control apparatus according to the present invention.

The continuously variable transmission, generally designated by the reference character T, has a fixed-displacement hydraulic pump P that can be actuated by an engine E through an input shaft 1, and a variable-displacement hydraulic motor M having an output shafts 2 for rotating road wheels W. The hydraulic pump P and the hydraulic motor M are connected to each other by a closed hydraulic circuit having a first hydraulic passage La interconnecting an outlet port of the pump P and an inlet port of the motor M and a second hydraulic passage La interconnecting an inlet port of the pump P and an outlet port of the motor M.

When the hydraulic pump P is actuated by the engine E, the hydraulic motor M is rotated by the hydraulic pressure supplied from the hydraulic pump P, and the rotation of the hydraulic motor M is transmitted through the output shaft 2 and a forward/reverse selector unit 8 to the road wheels W, thus rotating the road wheels W.

A charging pump 10 which is also actuated by the engine E has an outlet port connected to the closed hydraulic circuit through a charging hydraulic pas age Lh having a check valve 11 and a third hydraulic pas age Lc having a pair of check valves 3. Working oil in an oil sump 15 is pumped by the charging pump 10, and then regulated in pressure by a charging-pressure relief valve 12. The pressure-regulated working oil is then supplied to a lower-pressure one of the first and second hydraulic passages La, Lb through the check valves 3. To the closed hydraulic circuit, there is also connected a fourth hydraulic passage Ld having a shuttle valve 4 that is connected to a fifth hydraulic passage Le which is connected to the oil sump 15 through a low-pressure relief valve 6.

The shuttle valve 4 comprises three-position directional control valve which is shiftable depending on the difference between the hydraulic pressure s in the first and second hydraulic passages La, Lb for connecting the lower-pressure one of the first and second hydraulic passages La, Lb to the fifth hydraulic passage Le. The lower hydraulic pressure from the lower-pressure one of the first and second hydraulic passages La, Lb is regulated by the low-pressure relief valve 6. An amount of working oil which corresponds to the amount of working oil supplied through the check valve 3 is discharged through the fifth hydraulic passage Le to the oil sump 15. At the same time, the higher-pressure one of the first and second hydraulic passages La, Lb is connected through the shuttle valve 4 to a sixth hydraulic passage Lf.

The first and second hydraulic passages La, Lb are connected to each other by a seventh hydraulic passage Lg having a clutch valve 5 that opens or closes the seventh hydraulic passage Lg.

The hydraulic motor M comprises a swash-plate axial-piston motor having a swash plate those angle is controlled to increase or reduce the displacement of the hydraulic motor M for continuously varying the speed reduction ratio of the transmission T. The angle of the swash plate can be controlled by first and second hydraulic servo units 30, 50.

The first hydraulic servo unit 30 introduces higher-pressure working oil from the closed hydraulic circuit through the shuttle valve 4, the sixth hydraulic passage Lf, and a high-pressure line 120 connected to the sixth hydraulic passage Lf. The first hydraulic servo unit 30 directly controls the angle of the swash plate of the hydraulic motor M under the higher hydraulic pressure of the introduced higher-pressure working oil. More specifically, the first hydraulic servo unit 30 has a spool 31 which is moved to the left or right in FIG. 1 to supply the higher-pressure working oil into a cylinder chamber defined in the first hydraulic servo unit 30. A piston 32 of the first hydraulic servo unit 30 moves in unison with the spool 31 for angularly moving the swash plate of the hydraulic motor M. Since the structure of the first hydraulic servo unit 30 is known in the art, it will not be described in detail.

The second hydraulic servo unit 50 is operatively coupled to the spool 31 of the first hydraulic servo unit 30 through an interlink mechanism 45 for controlling the movement of the spool 31.

Figure 2:
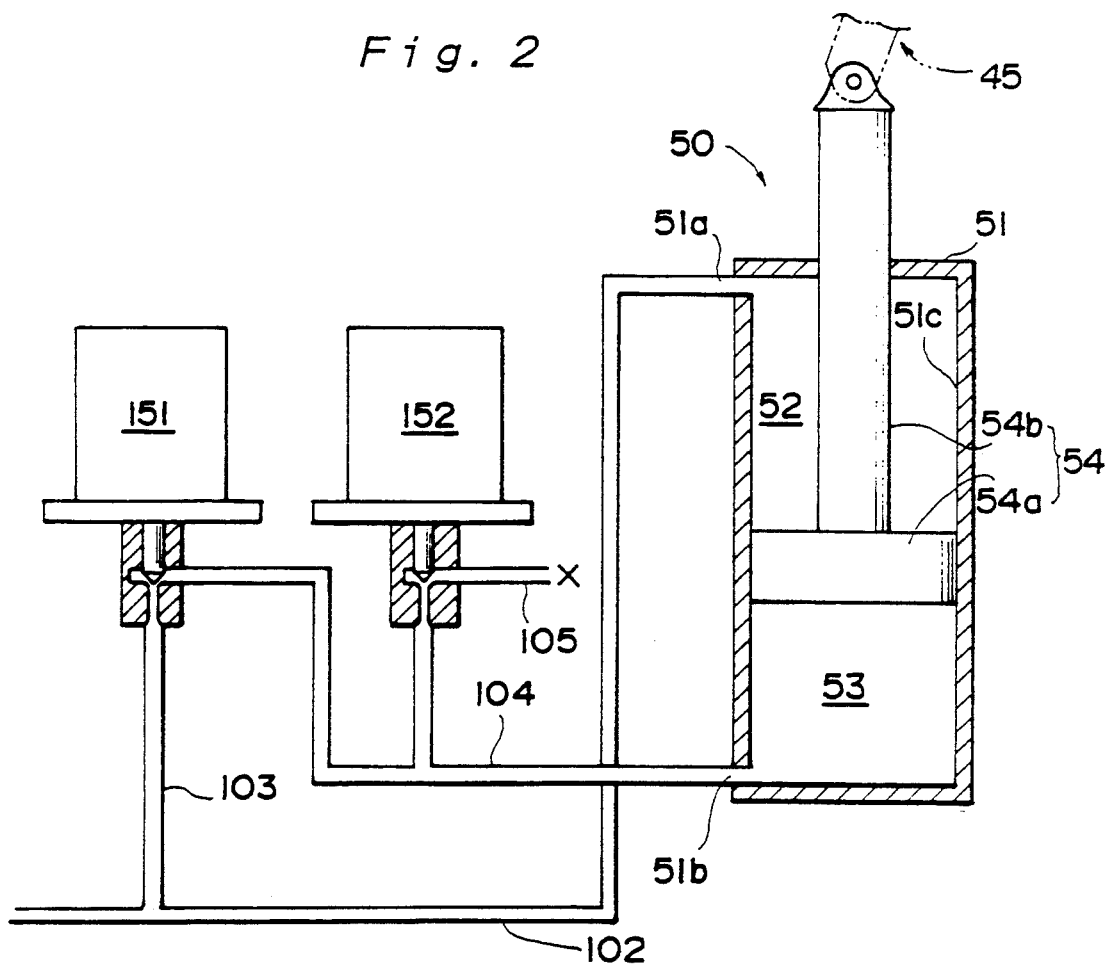
FIG. 2 is a schematic view, partly in cross section, of one of the hydraulic servo units and the operation control apparatus.

As shown in FIG. 2, the second hydraulic servo unit 50 comprises a housing 51 and a spool 54 vertically slidably fitted in the housing 51. The spool 54 comprises a piston 54a and a rod 54b coupled concentrically with and extending upwardly from the piston 54a. The piston 54a is slidably fitted in a cylinder chamber 51c defined vertically in the housing 51, and divides the cylinder chamber 51c into a rod-side chamber 52 defined above the piston 54a and through which the rod 54b extends, and a head-side chamber 53 defined below the piston 54a.

First and second hydraulic lines 102, 104 are connected respectively through ports 51a, 51b to the respective rod- and head-side chambers 52, 53. The spool 54 moves upwardly or downwardly depending on the hydraulic pressure acting on the piston 54a which is determined by the hydraulic pressures of working oil supplied to the , rod- and head-side chambers 52, 53 through the hydraulic lines 102, 104 and the pressure-bearing areas of the piston 54a which face into the rod- and head-side chambers 52, 53. The vertical movement of the spool 54 is transmitted through the interlink mechanism 45 to the spool 31 of the first hydraulic servo unit 30 for thereby moving the spool 31. Therefore, the angle of the swash plate of the hydraulic motor M, i.e., the speed reduction ratio of the transmission T, can be controlled by controlling the hydraulic pressure of the lower-pressure working oil that is supplied through the hydraulic lines 102, 104. Specifically, when the spool 54 is moved upwardly, it causes the first hydraulic servo unit 30 to reduce the swash angle plate of the hydraulic motor M, i.e., reduce the speed reduction ratio of the transmission T, and when the spool 54 is moved downwardly, it causes the first hydraulic servo unit 30 to increase the swash angle plate of the hydraulic motor M, i.e., increase the speed reduction ratio of the transmission T.

As shown in FIG. 1, the first hydraulic line 102 is connected through a hydraulic line 101 to a point of the charging hydraulic passage Lh which is located upstream of the charging-pressure relief valve 12. The second hydraulic line 104 is connected to a hydraulic line 103 branched from the first hydraulic line 102 through a first solenoid-operated valve 151. The second hydraulic line 104 is also connected to a drain hydraulic passage 105 through a second solenoid-operated valve 152.

The rate at which working oil flows from the hydraulic line 103 to the second hydraulic line 104 is controlled by the first solenoid-operated valve 151. The rate at which working oil flows from the second hydraulic line 104 to the drain hydraulic line 105 is controlled by the second solenoid-operated valve 152.

The charging pressure as regulated by the charging-pressure relief valve 12 acts in the rod-side chamber 52 through the first hydraulic line 102 at all times. The head-side chamber 53 is supplied with a hydraulic pressure which is lower than the charging pressure by the first and second solenoid-operated valves 151, 152. The pressure-bearing area of the piston 54a which faces into the road-side chamber 52 is smaller than the pressure-bearing area of the piston 54a which faces into the head-side chamber 53. Therefore, the forces applied in opposite directions to the pressure-bearing areas of the piston 54a under the hydraulic pressures in the chambers 52, 53 are brought into equilibrium when the hydraulic pressure in the head-side chamber 53 is of a value Pa which is smaller than the value Pu of the hydraulic pressure in the rod-side chamber 52 (Pu > Pa).

Therefore, when the hydraulic pressure in the head-side chamber 53 is made higher than the value Pa by opening the first solenoid-operated valve 151 and closing the second solenoid-operated valve 152, the spool 54 moves upwardly. Conversely, when the hydraulic pressure in the head-side chamber 53 is made lower than the value Pa by closing the first solenoid-operated valve 151 and opening the second solenoid-operated valve 152, the spool 54 moves downwardly.

Each of the first and second solenoid-operated valves 151, 152 is in the form of an injector-type needle valve and can be opened and closed based on the duty cycle of a pulse signal which is applied from a controller 100 (FIG. 1) over a signal line 100a. The duty cycle is an off-time duty cycle such that the solenoid-operated valves are open when the pulse signal is off and closed then the pulse signal is on.

The structure of the solenoid-operated valves 151, 152 which are identical to each other will be described below with reference to FIG. 3.

Figure 3:
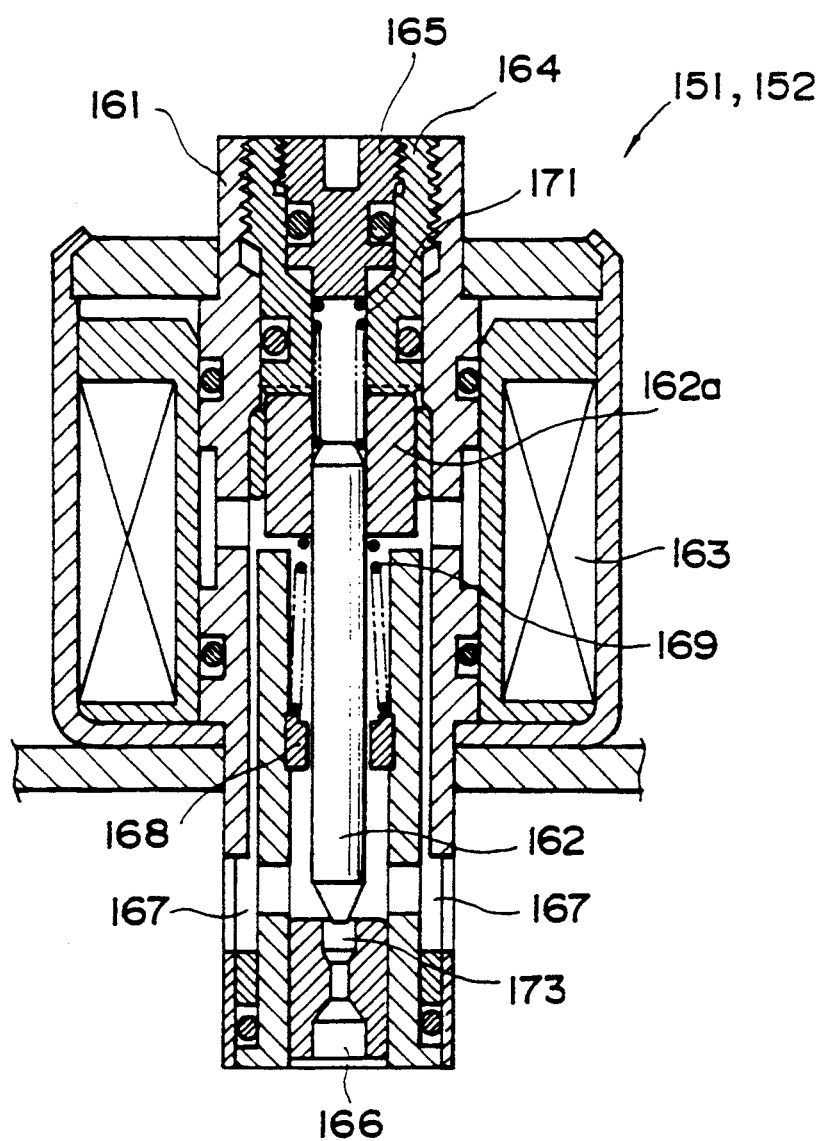
FIG. 3 is a sectional side elevational view of each of first and second solenoid-operated valves in the operation control apparatus.

As shown in FIG. 3, the solenoid-operated valve 151, 152 comprises a hollow cylindrical body 161, a spool 162 axially vertically movably disposed in the body 161, and a solenoid 163 disposed around the body 161.

A stroke adjustment screw 164 is threaded in the upper end of the body 161 for vertical positional adjustment with respect to the body 161. A load adjustment screw 165 is axially vertically threaded in the stroke adjustment screw 164 for vertical positional adjustment with respect to the stroke adjustment screw 164.

The body 161 has an inlet port 166 defined centrally in the lower end thereof for introducing working oil. The body 161 also has a pair of diametrically opposite outlet ports 167 defined in opposite side walls thereof slightly upwardly of the inlet port 166. The inlet port 166 communicates with the outlet ports 167 through a communication hole 173 defined axially in a valve seat in the body 161.

When the spool 162 is moved to fan upper position, it opens the communication hole 173, and when the spool 162 is moved to a lower position, it closes the communication hole 173.

A plunger 162a is fixed to an upper portion of the spool 162. The spool 162 and the plunger 162a are normally biased to move upwardly by a return spring 169 which is disposed around the spool 182 vertically between the lower end of the plunger 162a and the upper end of a bearing bushing 168 that is attached to an inner surface of an intermediate portion of the body 161. If the return spring 169 comprised a cylindrical coil spring, its lower end would tend to be caught between the bearing bushing 168 and the spool 162, obstructing the movement of the spool 162. Actually, the return spring 169 comprises a downwardly spreading conical coil spring with its lower end prevented from being caught between the bearing bushing 168 and the spool 162, and its upper end held against the outer circumferential surface of the spool 162 so that it will not wobble with respect to the spool 162.

The plunger 162a which is normally urged upwardly by the return spring 169 has its upper end held against the lower end of the stroke adjustment screw 164, so that the plunger 162a is held in its upper position. The upper position of the plunger 162a and hence the stroke of its vertical movement between the upper and lower positions thereof can be adjusted when the vertical position of the stroke adjustment screw 164 with respect to the body 161 is adjusted by turning the stroke adjustment screw 164.

A spring 171 for urging the spool 162 downwardly is disposed between and held against the upper end of the spool 162 and the lower end of the load adjustment screw 165.

When a pulse signal is applied in its on time to the solenoid 163, the solenoid 163 is energized to magnetically move the plunger 162a and the spool 162 downwardly toward the lower position against the bits of the return spring 169. When the spool 162 is in the lower position, the lower end thereof closes the upper open end of the communication hole 163, thereby disconnecting the inlet port 166 and the outlet ports 167 from each other. The downward movement of the spool 162 is assisted by the spring 171. The downward biasing force of the spring 171 can be adjusted when the vertical position of the load adjustment screw 165 with respect to the stroke adjustment screw 164 and hence the body 161 is adjusted.

The working oil flowing into the inlet port 166 can be discharged from the outlet ports 167 only when the solenoid 163 is de-energized to allow the spoil 162 to move upwardly thus opening the communication hole 173. The rate at which the working oil flows out of the outlet ports 167 can be controlled when the ratio of the-time (off time) in which the spool 162 opens the communication hole 173 to the period of the pulse signal, i.e., the duty cycle of the pulse signal.

Figure 4:
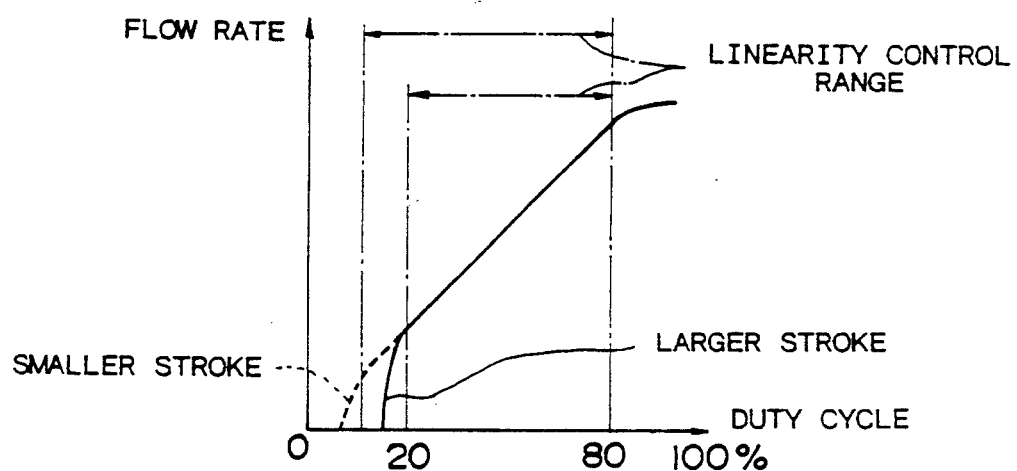
FIG. 4 is a graph showing the manner in which the rate at which working oil flows varies depending on the duty cycle for the solenoid-operated valves.

In the duty-ratio control process, the rate at which the working oil flows from the inlet port 166 to the outlet ports 167 is linearly proportional to the duty cycle in a certain range thereof, as shown in FIG. 4. The range in which the working oil flow rate is proportional to the duty cycle is referred to as a linearity control range.

The stroke of vertical movement of the spool 162 in each of the solenoid-operated valves 151, 152 is selected to be of a sufficiently large value, e.g., about 0.6 mm, so that dust particles or other foreign matter contained in the working oil will not be caught between the lower end of the spool 162 and the valve seat in which the communication hole 173 is defined.

With the relatively large stroke of vertical movement of the spool 162, the linearity control range for the solenoid-operated valves 151, 152, in which the working oil flow rate can increase linearly in proportion to an increase in the duty cycle, is smaller than if the stroke of vertical movement of the spool 182 were smaller. The linearity control range falls within a duty cycle range of from about 20 to 80%. If either one of the solenoid-operated valves 151, 152 were operated independently, it would not accurately control a relatively low working oil flow rate which may correspond to a duty cycle lower than 20%. A solenoid-operated valve with a smaller spool stroke would have a larger linearity control range, e.g., of from 10 to 90%, but would fail to accurately control the working oil flow rate with a duty cycle outside of the linearity control range.

According to the present invention, the solenoid-operated valves 151, 152 are simultaneously actuated with different duty cycles, respectively, that fall within the linearity control range. While the solenoid-operated valves 151, 152 are being actuated with their respective duty cycles in the linearity control range, the working oil is supplied from the hydraulic line 103 to the second hydraulic line 104 and discharged from the second hydraulic line 104 to the drain hydraulic passage 105 at different rates (hereinafter referred to as "supply rate" and "discharge rate", respectively). Therefore, working oil flows into or out of the head-side chamber 53 at a rate which corresponds to the difference between the duty cycles for the solenoid-operated valves 151, 152. The difference between the duty cycles for the solenoid-operated valves 151, 152 can be increased or reduced by controlling the duty cycles, thus increasing or reducing the rate at which the working oil flows into or out of the head-side chamber 53.

The difference between the duty cycles for the solenoid-operated valves 151, 152 is increased or reduced by keeping the duty cycle for one of the solenoid-operated valves while varying the duty cycle for the other solenoid-operated valve within the linearity control range.

Figure 5:
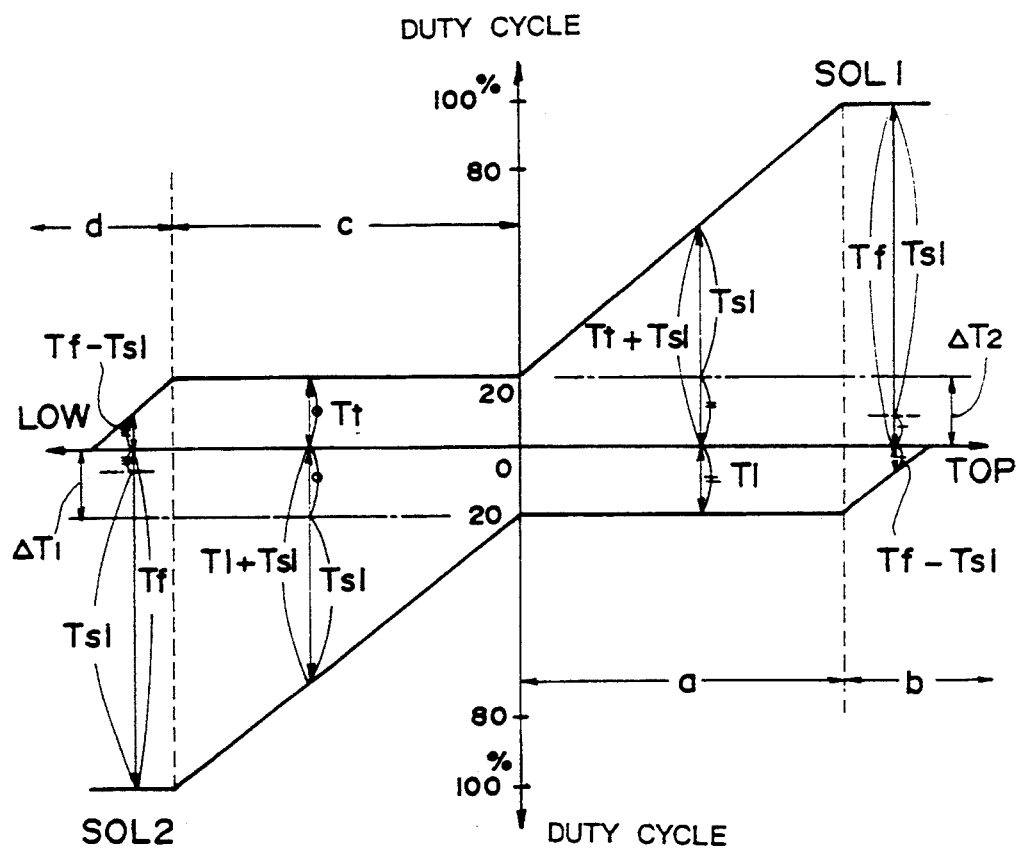
FIG. 5 is a graph showing values of the duty ratio for the solenoid-operated valves which are established with respect to a speed reduction ratio command signal.

More specifically, to increase or reduce the rate at which the working oil flows into the head-side chamber 53, i.e., to increase or reduce the rate at Which the speed reduction ratio decreases, as shown in FIG. 5, the duty cycle for the second solenoid-operated valve 152 is kept at a certain small duty cycle (20% in FIG. 5: hereinafter referred to as a "fixed duty cycle" for the second solenoid-operated valve 152) within the linearity control range whereas the duty cycle for the first solenoid-operated valve 151 is increased or reduced, as indicated in a range a in FIG. 5 (which should be less than the duty cycle of 80%). To increase or reduce the rate at which the working oil flows out of the head-side chamber 53, i.e., to increase or reduce the rate at which the speed reduction ratio increases, the duty cycle for the first solenoid-operated valve 151 is kept at a certain small duty cycle (20% in FIG. 5: hereinafter referred to as a "fixed duty cycle" for the first solenoid-operated valve 151) within the linearity control range whereas the duty cycle for the second solenoid-operated valve 152 is increased or reduced, as indicated in a range c in FIG. 5 (which should be less than the duty cycle of 80%).

In the illustrated embodiment, the fixed duty cycles for the first and second solenoid-operated valves 151, 152 are equal to the minimum duty cycle in the linearity control range. Through the fixed duty cycles may be of any value with the linearity control range, they should preferably be the minimum duty cycle in order to increase the controllable range of working oil flow rates.

By thus selecting the duty cycles for the first and second solenoid-operated valves 151, 152 within the linearity control range, the supply and discharge rates at which the working fluid is supplied from the hydraulic line 103 to the second hydraulic line 104 and discharged from the second hydraulic line 104 to the drain hydraulic passage 105 can accurately be controlled. As a result, the rates at which the working oil flows into and out of the head-side cylinder 53 can accurately be controlled. Particularly, the working oil flow into and out of the head-side cylinder 53 can accurately be controlled at very small rates.

Since the working oil flow control is made possible at vary small rates, the magnification ratio (gain) of a maximum flow rate with respect to a minimum flow rate is rendered greater than if the flow rate control is effected by a single solenoid-operated valve as has been the case with the conventional apparatus. Experimental data indicate that when a single solenoid-operated valve was actuated, the working flow rate ranged from a minimum if 10 liters/hour (with the duty cycle of 10%) to a maximum of 90 liters/hour (with the duty cycle of 100%), i.e, the gain was 9, whereas when two solenoid-operated valves, i.e., the first and second solenoid-operated valves 151, 152 in the illustrated embodiment, were simultaneously actuated, the working flow rate ranged from a minimum of 0.6 liter/hour to a maximum of 90 liters/hour (with the duty cycle for one of the solenoid-operated valves being 100% and the duty cycle for the other being 0%), i.e, the gain was 150. Therefore, the rate at which the second hydraulic servo unit 50 operates, i.e., the rate at which the transmission operates for speed changes, can be selected in a wide range from a very low level.

Inasmuch as the first and second solenoid-operated valves 151, 152 are simultaneously actuated, any fluctuations, depending on the temperature of the working oil, of the rate at which the working oil flows into and out of the head-side chamber 53 are much smaller than if a single solenoid-operated valve were actuated. The reason for this is that when the supply rate increases or decreases because of a temperature-dependent change in the viscosity of the working oil, the discharge rate also increases of decreases because of such a temperature-dependent change the viscosity of the working oil. As a consequence, the rates at which the working oil flows into and out of the head-side chamber 53, which are equal to the difference between the supply and discharge rates, do not undergo large fluctuations. Consequently, the second hydraulic servo unit 50 can operate stably at all times, and hence the speed reduction ratio of the transmission T can be controlled stably at all times regardless of the temperature of the working oil.

When the rates at which the working oil flows into and out of the head-side chamber 53 are to be maximized for a maximum operation rate of the transmission T, i.e., for a maximum operation rate of the first hydraulic servo unit 30, in order to reduce the speed reduction ratio as quickly as possible the duty cycle for the first solenoid-operated valve is selected closely to 100% and the duty cycle for the second solenoid-operated valve 152 to 0%, as shown in FIG. 5, though they are no longer within the linearity control range. In this manner, working oil can be supplied to and discharged from the head-side chamber 53 at a rate corresponding to the duty cycle of 100% for a single solenoid-operated valve for increasing or reducing the speed reduction ratio quickly.

Figure 6:
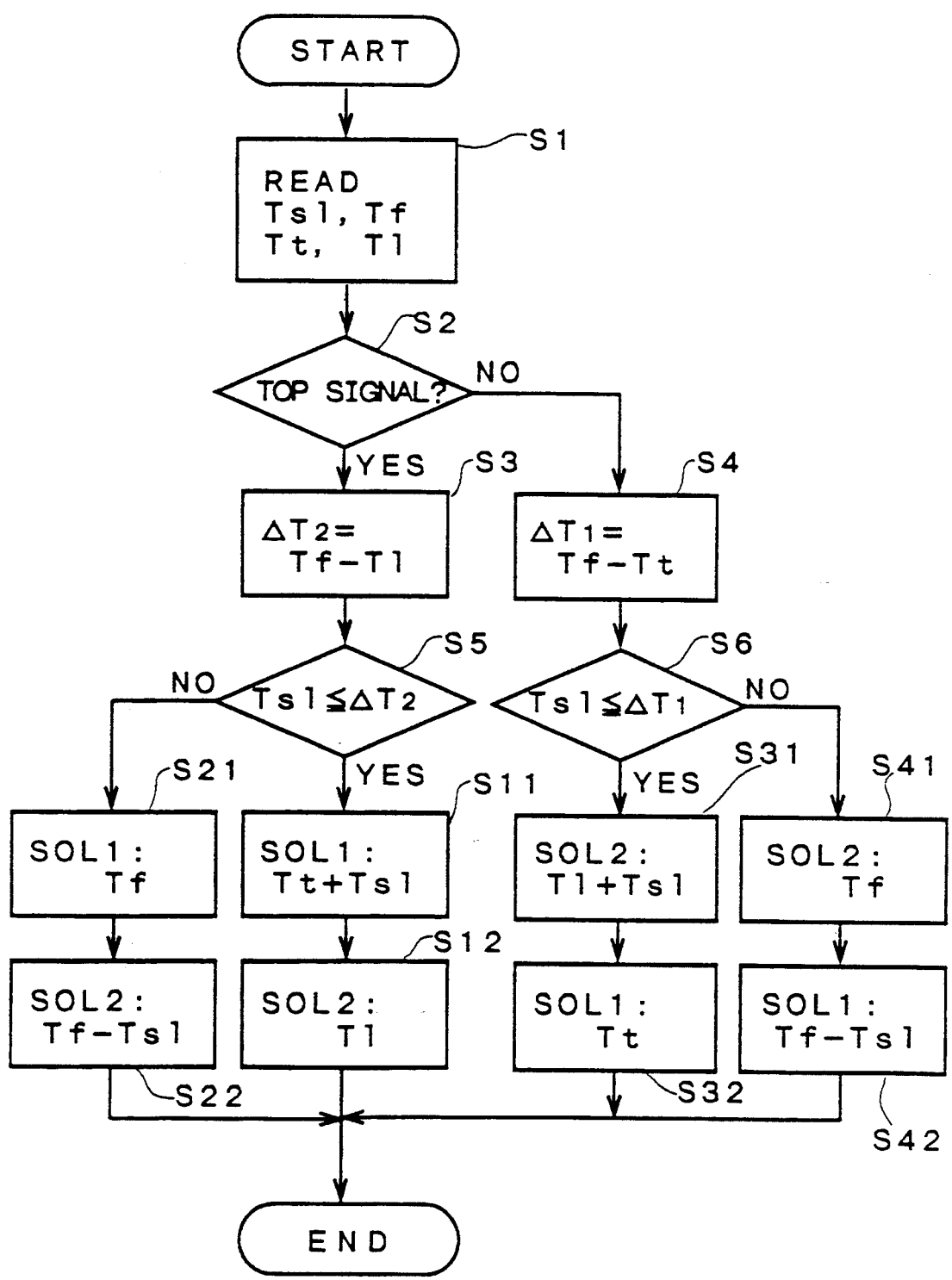
FIG. 6 is a flowchart of a control sequence to be executed by a controller for establishing the duty ratio.

The duty cycle for the solenoid-operated valves 151, 152 is established according a control sequence shown in FIG. 6. The control sequence is executed by the controller 100 shown in FIG. 1.

A step S1 reads a speed reduction ratio command signal Tsl representing the duty cycle difference corresponding to the rate at which the working oil is to flow into and out of the head-side chamber 53 for obtaining a desired rate at which the speed reduction ratio is to vary, and the direction in which the working oil is to flow into and out of the head-side chamber 53, i.e., the direction in which the speed reduction ratio is to vary. The step S2 also reads a maximum duty cycle signal Tf corresponding to a maximum duty cycle (100%) for the solenoid-operated valves 151, 152, a first fixed duty cycle signal Tt corresponding to the first fixed duty cycle for the first solenoid-operated valve 151, and a second fixed duty cycle signal Tl corresponding to the second fixed duty cycle for the second solenoid-operated valve 152.

Then, a step S2 determines whether the speed reduction ratio command signal Tsl indicates a reduction in the speed reduction ratio or not. If the speed reduction ratio command signal Tsl indicates a reduction in the speed reduction ratio, i.e., a shift toward TOP position, then control goes to a step S3. If the speed reduction ratio command signal Tsl indicates an increase in the speed reduction ratio, i.e., a shift toward LOW position, then control goes to a step S4.

The step S3 calculates a signal $\Delta T2$ by deducting the second fixed duty cycle signal Tl from the maximum duty cycle signal Tf.

The step S4 calculates a signal $\Delta T1$ by deducting the first fixed duty cycle signal Tt from the maximum duty cycle signal Tf.

The step S3 is followed by a step S5 which determines whether or not the speed reduction ratio command signal Tsl is equal to or smaller than the signal $\Delta T2$, i.e., whether it belongs to the region $a$ or $b$ in FIG. 5. If the speed reduction ratio command signal Tsl is equal to or smaller than the signal $\Delta T2$, i.e., it belongs to the region $a$, then control goes to a step S11. If the speed reduction ratio command signal Tsl is larger than the signal $\Delta T2$, i.e., it belongs to the region $b$, then control goes to a step S21.

The step S4 is followed by a step S6 which determines whether or not the speed reduction ratio command signal Tsl is equal to or smaller than the signal $\Delta T1$, i.e., whether it belongs to a region $c$ or $d$ in FIG. 5. If the speed reduction ratio command signal Tsl is equal to or smaller than the signal $\Delta T1$, i.e., it belongs to the region $c$, then control goes to a step S31. If the speed reduction ratio command signal Tsl is larger than the signal $\Delta T1$, i.e., it belongs to the region $d$, then control goes to a step S41.

In the step S11, the duty cycle for the first solenoid-operated valve 151 (SOL1) is set to (Tt+Tsl), i.e., a range of from 20 to 100%. Then, the duty cycle for the second solenoid-operated valve 152 (SOL2) is set to Tl, i.e., the second fixed duty cycle, in a step S12.

In the step S21, the duty cycle for the first solenoid-operated valve 151 (SOL1) is set to Tf, i.e., a range of 100%. Then, the duty cycle for the second solenoid-operated valve 152 (SOL2) is set to (Tf−Tsl), i.e., a duty cycle of from 20 to 0%. in a step S22

In the step S31, the duty cycle for the second solenoid-operated valve 152 (SOL2) is set to (Tl +Tsl), i.e., a range of from 20 to 100%. Then, the duty cycle for the first solenoid-operated valve 151 (SOL1) is set to Tt, i.e., the first fixed duty cycle, in a step S32.

In the step S41, the duty cycle for the second solenoid-operated valve 152 (SOL2) is set to Tf, i.e., a range of 100%. Then, the duty cycle for the first solenoid-operated valve 151 (SOL1) is set to (Tf−Tsl), i.e., a duty cycle of from 20 to 0%. in a step S42.

Figure 7:
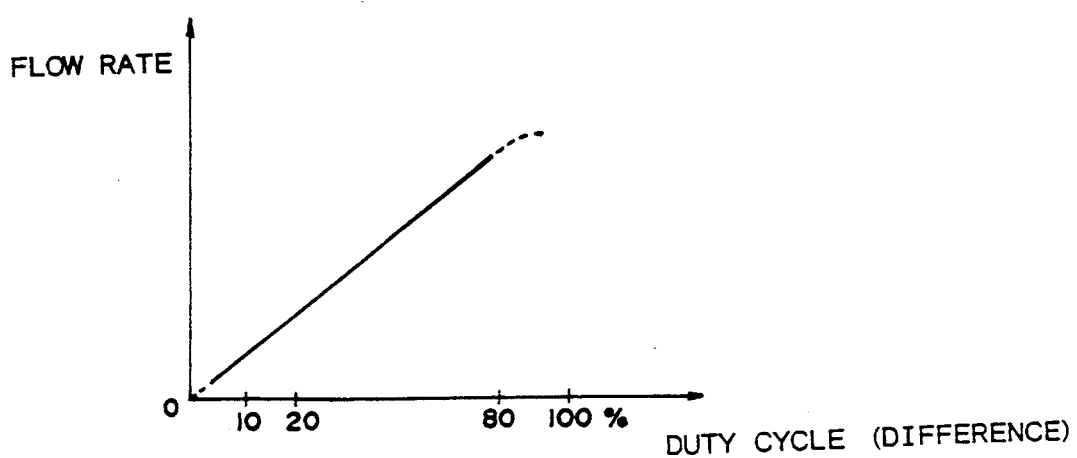
FIG. 7 is a graph showing the relationship between the rate at which working oil flows into the hydraulic servo unit and the difference between the duty ratios for the first and second solenoid-operated valves.

The duty cycle to be set in the steps S22, S42 should preferably be corrected in view of the relationship between the actual duty cycle and the working oil flow rate (see FIG. 7).

When the first and second solenoid-operated valves 151, 152 are simultaneously actuated with the duty cycles determined according to the above control sequence, the rate at which the working oil flows varies in proportion to the duty cycle difference in a wide range from a very low rate to a high rate. The working oil can accurately be controlled especially in a very low rate range for operating the hydraulic servo units 50, 30 at very low speed, with the result that the continuously variable transmission T can precisely and smoothly be controlled for varying the speed reduction ratio.

Although a certain preferred embodiment of the present invention has been shown and described in detail, it should be understood that various changes and modifications may be made therein without departing from the scope of the appended claims.

What is claimed is:

1. An apparatus for controlling operation of a hydraulic servo unit, comprising:
   a hydraulic servo unit comprising a cylinder having a cylinder chamber defined therein, a piston slidably fitted in said cylinder chamber, and a rod projecting axially from said piston, said piston dividing said cylinder chamber into a rod-side chamber on one side of said piston, said rod extending through said rod-side chamber, and a head-side chamber on an opposite side of said piston;
   a first hydraulic pressure supply passage connected to said rod-side chamber for supplying working oil under predetermined hydraulic pressure;
   a first solenoid-operated valve openable and closable according to a duty cycle of a pulse signal applied thereto;
   a second hydraulic pressure supply, passage connected to said head-side chamber through said first solenoid-operated valve;
   a second solenoid-operated valve openable and closable according to a duty cycle of a pulse signal applied thereto;
   a drain hydraulic passage connected to said second hydraulic pressure supply passage through said second solenoid-operated valve; and
   control means for simultaneously actuating said first solenoid-operated valve with a first duty cycle and said second solenoid-operated valve with a second duty cycle, said control means capable of varying said first and second duty cycles wherein each of said duty cycles has a non-correlated relationship to the other in order to vary a rate at which the working oil flows into or out of said head-side chamber through said second hydraulic pressure supply passage, wherein said control means comprises means for simultaneously actuating said first and second solenoid-operated valves with the respective first and second duty cycles each falling within a linearity control range in which the rate at which the working oil flows varies linearly in proportion to the duty cycles, said linearity control range excluding a range in the vicinity of 0% and a range in the vicinity of 100%.

2. An apparatus for controlling the operation of a hydraulic servo unit, comprising:
   a hydraulic servo unit having a cylinder and a piston slidably fitted in said cylinder forming a chamber on one side of said piston;
   a first solenoid-operated valve openable and closable according to a duty cycle of a pulse signal applied thereto;
   hydraulic pressure supply passage means connected to said chamber through said first solenoid-operated valve;
   a second solenoid-operated valve openable and closable according to a duty cycle of a pulse signal applied thereto;
   hydraulic drain passage means connected to said chamber through said second solenoid-operated valve; and
   control means for simultaneously actuating said first solenoid-operated valve with a first duty cycle and said second solenoid-operated valve with a second duty cycle, said control means capable of varying said first and second duty cycles wherein each of said duty cycles has a non-correlated relationship to the other for varying the flow of a working oil into or out of said chamber for controlled movement of said piston.

3. An apparatus according to claim 2, wherein said control means comprises means for simultaneously actuating said first and second solenoid-operated valves with the respective first and second duty cycles each falling within a linearity control range in which the rate at Which the working oil flows varies linearly in proportion to the duty cycles, said linearity control range excluding a range in the vicinity of 0% and a range in the vicinity of 100%.

4. An apparatus for controlling operation of a hydraulic servo unit having a chamber, comprising:
   a first solenoid-operated valve openable and closable according to a duty cycle of a pulse signal applied thereto;
   a hydraulic pressure supply passage connected to the chamber through said first solenoid-operated valve;
   a second solenoid-operated valve openable and closable according to a duty cycle of a pulse signal applied thereto;
   an hydraulic drain passage connected to the chamber through said second solenoid-operated valve; and
   control means for actuating said first solenoid-operated valve with a pulse signal having a first duty cycle, while simultaneously actuating said second solenoid operated valve with a pulse signal having a second duty cycle, said first and second duty cycles being independently determined by said control means for varying the flow of a working oil into or out of the chamber.

5. An apparatus according to claim 4, Wherein each of said first and second duty cycles falls within a linearity control range in which the rate at which the working oil flows into or out of the chamber varies linearly in proportion to the respective duty cycles.

6. An apparatus for controlling operation of a hydraulic servo unit, comprising:
   a hydraulic servo unit comprising a cylinder having a cylinder chamber defined therein, a piston slidably fitted in said cylinder chamber, and a rod projecting axially from said piston, said piston dividing said cylinder chamber into a rod-side chamber on one side of said piston, said rod extending through said rod-side chamber, and a head-side chamber on an opposite side of said piston;

a first hydraulic pressure supply passage connected to said rod-side chamber for supplying working oil under predetermined hydraulic pressure;

a first solenoid-operated valve openable and closable according to a duty cycle of a pulse signal applied thereto;

a second hydraulic pressure supply passage connected to said head-side chamber through said first solenoid-operated valve;

a second solenoid-operated valve openable and closable according to a duty cycle of a pulse signal applied thereto;

a drain hydraulic passage connected to said second hydraulic pressure supply passage through said second solenoid-operated valve; and control means for simultaneously actuating said first solenoid-operated valve with a first duty cycle and said second solenoid-operated valve with a second duty cycle, said control means capable of varying said first and second duty cycles to vary a rate at which the working oil flows into or out of said head-side chamber, wherein said control means comprises means for simultaneously actuating said first and second solenoid operated valves with the respective first and second duty cycles each falling within a linearity control range in which the rate at which the working oil flows varies linearly in proportion to the duty cycles, said linearity control range excluding a range in, the vicinity of 0% and a range in the vicinity of 100%, and wherein said control means comprises means for varying said first and second duty cycles by keeping said second duty cycle at a predetermined duty cycle within said linearity control range and varying said first duty cycle within said linearity control range to vary the rate at which the working oil flows into said head-side chamber through said second hydraulic pressure supply passage, and for varying the difference between said first and second duty cycles by keeping said first duty cycle at a predetermined duty cycle within said linearity control range and varying said second duty cycle within said linearity control range to vary the rate at which the working oil flows out of said head-side chamber through said drain hydraulic passage.

7. An apparatus according to claim 6 wherein each of said predetermined duty cycles is substantially equal to a minimum duty cycle in said linearity control range.

8. An apparatus for controlling the operation of a hydraulic servo unit, comprising:

a hydraulic servo unit having a cylinder and a piston slidably fitted in said cylinder forming a chamber on one side of said piston;

a first solenoid-operated valve openable and closable according to a duty cycle of a pulse signal applied thereto;

hydraulic pressure supply passage means connected to said chamber through said first solenoid-operated valve;

a second solenoid-operated valve openable and closable according to a duty cycle of a pulse signal applied thereto;

hydraulic drain passage means connected to said chamber through said second solenoid-operated valve; and control means for simultaneously actuating said first solenoid-operated valve with a first duty cycle and said second solenoid-operated valve with a second duty cycle for varying the flow of a working oil into or out of said chamber for controlled movement of said piston, wherein said control means comprises means for simultaneously actuating said first and second solenoid-operated valves with the respective first and second duty cycles each falling within a linearity control range in which the rate at which the working oil flows varies linearly in proportion to the duty cycles, said linearity control range excluding a range in the vicinity of 0% and a range in the vicinity of 100%, and wherein said control means comprises means for varying said first and second duty cycles by keeping said second duty cycle at a predetermined ratio within said linearity control range and varying said first duty cycle within said linearity control range to vary the rate at which the working oil flows into said chamber through said hydraulic pressure supply passage means, and for varying said first and second duty cycles by keeping said first duty cycle at a predetermined ratio within said linearity control range and varying said second duty cycle within said linearity control range to vary the rate at which the working oil flows out of said chamber through said hydraulic drain passage means.

9. An apparatus according to claim 8 wherein each of said predetermined duty cycles is substantially equal to a minimum duty cycle in said linearity control range.

10. An apparatus for controlling operation of a hydraulic servo unit having a chamber, comprising:

a first solenoid-operated valve openable and closable according to a duty cycle of a pulse signal applied thereto;

a hydraulic pressure supply passage connected to the chamber through said first solenoid-operated valve;

a second solenoid-operated valve openable and closable according to a duty cycle of a pulse signal applied thereto;

an hydraulic drain passage connected to the chamber through said second solenoid-operated valve; and control means for actuating said first solenoid-operated valve with a pulse signal having a first duty cycle, while simultaneously actuating said second solenoid operated valve with a pulse signal having a second duty cycle, said first and second duty cycles being independently determined by said control means for varying the flow of a working oil into or out of the chamber, wherein each of said first and second duty cycles falls within a linearity control range in which the rate at which the working oil flows into or out of the chamber varies linearly in proportion to the respective duty cycles, and wherein said control means comprises means for varying the difference between said first and second duty cycles by keeping said second duty cycle at a predetermined duty cycle within said linearity control range and varying said first duty cycle within said linearity control range to vary the rate at which the working oil flows into the chamber through said hydraulic pressure supply passage, and for varying the difference between said first and second duty cycles by keeping said first duty cycle at a predetermined duty cycle within said linearity control range and varying said second duty cycle within said linearity control range to vary the rate at which the working oil flows out of the chamber through said hydraulic drain passage.

11. An apparatus according to claim 10, wherein each of said predetermined duty cycles is substantially equal to a minimum duty cycle in said linearity control range.

* * * * *